Patented Jan. 18, 1949

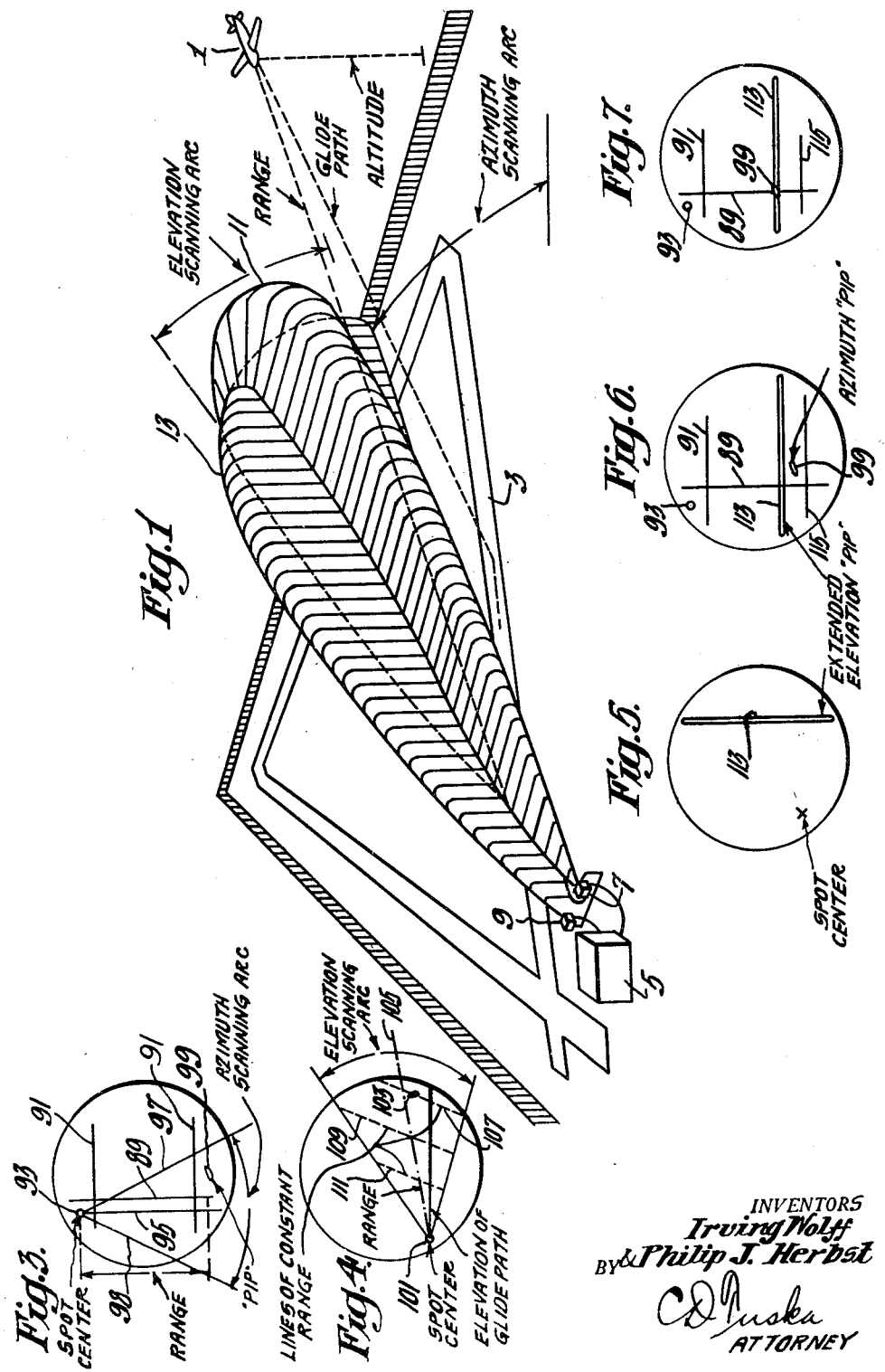

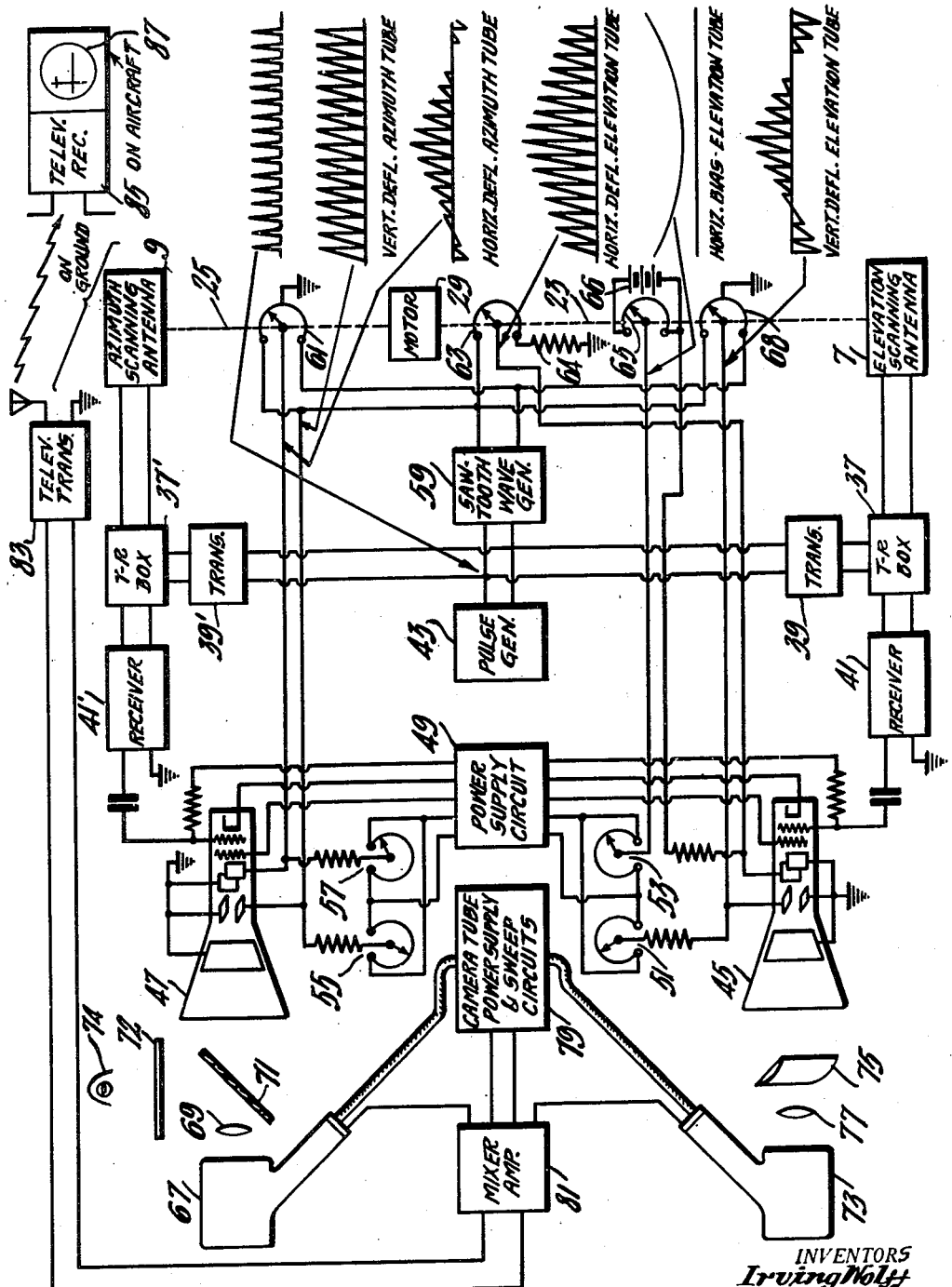

2,459,481

UNITED STATES PATENT OFFICE 2,459,481

INSTRUMENT LANDING SYSTEM

Irving Wolff and Philip J. Herbst, Princeton, N. J., assignors to Radio Corporation of America, a corporation of Delaware Application October 18, 1945, Serial No. 623,106

9 Claims. (Cl. 343—6)

This invention relates to instrument landing systems for aircraft, and more particularly to improvements in systems of the type wherein the position of an aircraft is determined by its reflection of radio signals transmitted from a ground station, and the information is relayed by radio from the ground station to the aircraft.

The principal object of the instant invention is to provide improved methods of and means for visual indication of the position of an aircraft on or with respect to a predetermined line such as a glide path.

The invention will be described with reference to the accompanying drawings, of which:

Figure 1 is a perspective view of an airport, illustrating the directive patterns of the antennas of two radio echo systems used for determining the azimuth and elevation respectively of an approaching aircraft, Figure 2 is a schematic circuit diagram of an embodiment of the present invention, Figure 3 shows a typical indication of azimuth provided by the system of Figure 2.

Figure 4 shows an indication of elevation as provided in the system of Figure 2, Figure 5 shows the indication of Figure 4 as it is modified in accordance with the instant invention, Figure 6 shows a combined indication of azimuth, elevation, and range as provided by the system of Figure 2, and Figure 7 shows another indication of the same type as that shown in Figure 6.

In accordance with the instant invention, two radio object detector systems, preferably of the pulse echo type, are operated to scan limited sectors in the neighborhood of the glide path which an incoming craft is to follow. The object detector systems (hereinafter termed "radar" systems) are each made highly directive in one plane, having generally fan-shaped directive patterns.

The fan-shaped pattern of one radar system is in a vertical plane and is cyclically moved from side to side for azimuth scanning. The fan-shaped pattern of the other radar system is at right angles to that of the first, and is cyclically raised and lowered for scanning in elevation.

Each time one of the oscillating fan patterns passes through the aircraft, a pulse is reflected back to the corresponding radar system. The position of the directive pattern at this instant is an indication of the azimuth or elevation of the craft from the radar station. The azimuth and elevation information is displayed visually on two cathode ray oscilloscope tubes.

This information, together with other pertinent visual information such as a diagram of the airport runway, is transmitted to the aircraft by way of a conventional television channel. By observing the television receiver, and guiding his craft accordingly, the pilot can follow the proper glide path to the runway.

Referring to Figure 1, an airplane 1 is approaching to land on a runway 3. A radar station 5 is provided adjacent the runway 3, and includes two radar systems having separate directive antennas 7 and 9. The antenna 7 has a fan-shaped directive lobe 11, wide in azimuth and narrow in elevation. The antenna 9 has a fan-shaped directive lobe 13, narrow in azimuth and wide in elevation.

The antennas 7 and 9 may be structures of the type described in copending U. S. patent application Serial No. 533,311, filed April 29, 1944 by Harley A. Iams, and entitled Radio wave devices. However, any other known antenna devices, providing a fan-like directive pattern which can be oscillated in the manner described, may be used.

Referring to Figure 2, a motor 29 is coupled through shafts 23 and 25 to the antennas 7 and 9 respectively for driving them to scan through vertical and horizontal sectors of, for example, approximately ten degrees.

The antenna 7 is connected to a T-R box, or antenna duplexer circuit 37, which is connected to a transmitter 39 and a receiver 41. The antenna 9 is similarly connected to a T-R box 37', a transmitter 39', and a receiver 41'. The transmitter 39' and receiver 41' are tuned to operate on a somewhat different carrier frequency from the transmitter 39 and receiver 41. Both transmitters 39 and 39' are connected to be modulated or keyed by a pulse generator 43.

The output circuits of the receivers 41 and 41' are coupled to the intensity control electrodes of a pair of cathode ray oscilloscope tubes 45 and 47 respectively. The various anode and bias voltages for the tubes 45 and 47 are provided by a power supply circuit 49.

The cathode ray deflection circuits of the tube 45 include conventional centering controls 51 and 53 for adjustably biassing the deflection means to "center" the beam at a predetermined spot on the luminescent screen of the tube. The tube 47 is provided with similar centering means 55 and 57.

The vertical deflection circuit of the tube 47 is coupled to the output of a sawtooth wave generator 59. The generator 59 is connected to the pulse generator 43 for synchronization, so that a sawtooth wave cycle is initiated in the generator 59 with each pulse from the generator 43. The sawtooth wave generator 59 has a center tapped output circuit, with the center tap grounded. A variable voltage divider 61, also provided with a grounded center tap, is connected between the output of the sawtooth generator 61 and the horizontal deflection circuit of the tube 47. The voltage divider 61 is mechanically coupled to the shaft 25, so that the amplitude of the sawtooth wave voltage applied to the horizontal deflection circuit of the tube 47 increases and decreases in alternate polarities as the shaft 25 is rotated.

A second variable voltage divider 63 is connected across one side of the output of the sawtooth generator 59 in series with a resistor 64. The variable arm of the voltage divider 63 is connected to the horizontal deflection circuit of the cathode ray tube 45. A third voltage divider 65 is connected between a D.-C. source 66 and the horizontal centering circuit of the tube 45. A further voltage divider 68, similar to the voltage divider 61, is connected between the sawtooth generator and the vertical deflection circuit of the tube 45. The voltage dividers 63, 65 and 68 are coupled to the shaft 25 like the voltage divider 61.

The voltage divider 68, as well as the first voltage divider 61, operates to provide an output amplitude which varies between a predetermined positive value and a predetermined negative value as the shaft 25 is rotated. The voltage divider 63 provides an output which varies in amplitude between two predetermined values, but does not reach zero at either extreme position of the directive pattern. The voltage divider 65 provides a variable bias on the horizontal deflection of the tube 45.

A television camera tube 67 is disposed in front of the fluorescent screen of the cathode ray tube 47. A camera lens 69 of ordinary design is provided between the tubes 47 and 67, for focusing an image of the face of the tube 47 upon the pickup electrode of the tube 67. A transparent sheet 71 is disposed between the tube 47 and the lens 69 at an angle of 45° to the optical axis. An opaque mask 72 is provided with a slit or transparent line and disposed adacent the sheet 71. The mask 72 is illuminated from behind by a light source 74.

A second camera tube 73 is provided in front of the tube 45. A cylindrical lens 75 is provided in front of the screen of the tube 45, in addition to a focusing lens 77 similar to the lens 69. The purpose of the cylindrical lens 75 is to cause a luminous spot on the face of the tube 45 to appear at the tube 73 as a line, parallel to the axis of the lens 75, and in a lateral position on the tube 73 corresponding to the lateral position of the spot on the tube 45.

The various bias voltages, power supply, and deflection voltages for the camera tubes 67 and 73 are provided by a source 79. The video frequency outputs of the tubes 67 and 73 are applied to a mixing amplifier 81, where they are combined and applied to the modulation input of a television transmitter 83. The usual television synchronizing signals are provided by the source 79 and mixed in the amplifier 81 for transmission with the video signals in conventional manner.

The aircraft 1 of Figure 1 is provided with a television receiver 85 tuned to respond to the transmitter 83 and including a cathode ray oscilloscope tube 87.

The adjustment and operation of the described system is as follows:

The pulse generator 43 produces a continuous train of cyclically repeating voltage pulses, each pulse having a duration of the order of ¼ microsecond. Each pulse causes the transmitter 39' to provide a corresponding pulse of radio frequency energy which goes through the T-R box 39' to the antenna 9, and is radiated thereby in the vertical fan-like pattern 13 (Figure 1). In the intervals between successive pulses, the T-R box 37' connects the receiver 41' to the antenna 9.

The pattern 13 is swept laterally back and forth at a relatively low rate, compared to the pulse repetition frequency. During a brief portion of each oscillation of the antenna 9, the lobe 13 is directed toward the airplane 1, and the transmitted pulses are reflected thereby back to the antenna 9. The reflected pulses are applied through the T-R box 37' to the receiver 41', where they are detected to provide voltage pulses similar to those produced by the pulse generator 43 but delayed with respect thereto by short intervals corresponding to the time required for the radiation to travel from the antenna 9 to the aircraft and back again.

Each pulse from the receiver 41' momentarily increases the intensity of the cathode ray beam of the tube 47, producing a luminous spot on the screen. The intensity control electrode of the tube 47 is normally biassed to provide only a faint visible trace upon the screen.

The centering controls 55 and 57 are adjusted to normally place the cathode ray spot at a position on the screen corresponding to the map location of the antenna 9 with respect to the runway 3. The center line of the runway is represented on the mask 72 by the transparent line. This line is superimposed on the image of the screen of the tube 47 as a luminous line 89 (Figure 3). The edge of the runway may be represented by a similar line 91. The undeflected position of the cathode ray spot is at the point 93.

The output of the sawtooth wave generator 59 is applied directly to the vertical deflection circuit of the tube 47. In the absence of any horizontal deflection, the spot would trace a vertical line 95 on the screen of the tube 47. However, horizontal deflection voltage is also applied to the tube 47 through the voltage divider 61. As the shaft 25 rotates, the horizontal deflection voltage varies between predetermined positive and negative amplitudes. When the horizontal deflection voltage is at its maximum positive value, the cathode ray beam is deflected to trace the slant line 97 on the screen of the tube 47 and when it is at its maxium negative value, the beam traces the line 98. Thus as the amplitude of the horizontal deflection voltage varies with the position of the shaft 25, the linear trace of the cathode ray beam sweeps through the sector included between the lines 98 and 97, its position corresponding to the angular position of the pattern of the antenna 9. Preferably an "expanded sweep" is used, i. e. the angle between the lines 98 and 97 is several times the total scanning arc of the antenna, so that the ten degrees of antenna scanning is represented by 30 or 40 degrees on the cathode ray image.

Each trace outward from the point 93 of the cathode ray beam is initiated with a pulse from the generator 43. Thus the vertical distance of the brightened spot from the point 93 is proportional to the distance of the aircraft from the antenna 9. One such spot or "pip" is shown at 99 in Figure 3. The position of the aircraft laterally of the runway is indicated by the position of the "pip" 99 laterally with respect to the line 89. This operation is continuous, the spot 99 moving on the screen of the tube 47 in accordance with the motion of the aircraft.

The transmitter 39 also provides a pulse of radio frequency energy corresponding to each voltage pulse from the pulse generator 43. These pulses are radiated by the antenna 7 in the pattern 11, which oscillates up and down. As the pattern 11 passes through the position of the aircraft 1, pulses are reflected back and applied to the receiver 41, momentarily intensifying the cathode ray beam of the tube 45.

The centering controls 51 and 53 are adjusted to set the cathode ray spot normally at the point 101 (Figure 4) near the edge of the screen of the tube 25. Horizontal deflection voltage is applied to the tube 45 through the voltage divider 63. The amplitude of this voltage is not constant, but varies in accordance with the position of the shaft 25, being greatest when the pattern of the antenna 7 is at its extreme elevation. The varying D.-C. bias supplied from the voltage divider 65 is superimposed in the horizontal deflection voltage, for a purpose explained hereinafter.

Vertical deflection voltage for the tube 45 is derived from the voltage divider 68. This voltage varies in amplitude and polarity like the horizontal deflection voltage for the tube 47.

The deflection pattern of the spot on the tube 45 is similar to that of the tube 47. As in the azimuth system, an "expanded sweep" is employed. However, since the amplitude of the horizontal deflection voltage varies with the elevation of the antenna 7, the horizontal distance of the "pip" 103 from the deflection center 101 depends upon the elevation of the aircraft as well as on its distance. The effect of the varying horizontal bias is neglected for the present. At some predetermined elevation, such as that corresponding to the line 105, the distance of the "pip" from its deflection center on the tube 45 will be the same as that on the tube 47. At greater elevations, the distance of the pip on the tube 45 from its deflection center will be greater than that of the pip on the tube 47, and at lower elevations it will be less. The dash line 107 in Figure 4 shows the locus of the positions of the pip when the aircraft is at a constant range from the radar station but at different elevations. The lines 109 and 111 are similar constant-range lines corresponding to respectively different ranges.

The image of the screen of the tube 47, substantially as it appears in Figure 3, is focused by the lens 69 upon the camera tube 67. The image of the screen of the tube 45 is distorted, as described above, by the cylindrical lens 75 so that it presents the appearance of Figure 5. The pip 103 of Figure 4 is extended to a line 113. This distorted image is focused by the lens 77 on the camera tube 73.

The video signals from the camera tubes 67 and 73, corresponding to the images of Figures 3 and 5 respectively, are combined in the amplifier 81. The camera tube 73 is disposed at an angle of 90° with respect to the tube 67 (or its horizontal and vertical deflection voltages are interchanged with respect to those of the tube 67) so that the video output of the amplifier 81 corresponds to the image of Figure 6, with the deflection centers coinciding at the point 93 and the extended elevation pip 113 horizontal instead of vertical. This combined image is transmitted by the transmitter 83 and appears on the receiver tube 87 on the aircraft.

The interpretation of the resulting picture is very simple; as long as the pip 99 is on the line 89, the aircraft is directly above the runway, and at a distance from the radar station corresponding to the distance of the pip 99 from the deflection center 93. When the aircraft is at the angle of elevation corresponding to the line 105 of Figure 4, the distance of the line 113 of Figure 6 from the point 93 will be the same as that of the pip 99, i. e., the pip 99 will lie on the line 113. If the craft is at a greater elevation angle, the line 113 will be further from the point 93. If the craft is at a lower elevation angle, the pip 99 is below the line 113, as shown in Figure 6.

The voltage dividers 63 and 68 are adjusted with respect to the shaft 25 so that the elevation angle corresponding to the line 105 (Figure 4) is the angle of the glide path to be followed by the aircraft. Unless the position of the radar station along the glide path is the same as the intersection of the glide path with the runway, the elevation angle of the glide path will not be constant, but will decrease with the approach of the aircraft. The voltage divider 65 biasses the deflection center horizontally on the elevation tube 45 in accordance with the position of the pattern, to compensate the effect of this variation in elevation of the glide path. The deflection center is moved to the right from the point 101 as the elevation of the pattern decreases, so that the deflection of the pip 103 will be the same as that of the azimuth pip 99 when the aircraft is at the proper elevation angle with respect to the radar station.

Thus the pilot needs only to steer his craft to maintain the pip 99 at the intersection of the lines 89 and 113, as shown in Figure 7. If the craft is off course to the right or left, the pip 99 will shift accordingly to the right or left of the line 89. Similarly if the craft is above or below the prope glide path, the pip 99 will appear above or below the line 113. As the craft approaches the radar station, the line 113 and the pip 99 both approach the point 93 and the line 91 which represents the edge of the runway.

Although it has been assumed that the voltage divider 65 is designed to cause the indications to correspond to a straight line glide path, it will be apparent that a glide path of any desired curvature can be provided by proper design of the resistance-rotation characteristic of the voltage divider 65.

A further line 115 may be provided on the mask 72. The intersection of this line with the runway line 89 may be used for checking the altimeter of the aircraft by indicating to the pilot a definite point on the glide path corresponding to some predetermined altitude, such as 200 feet.

Although a specific embodiment of the invention has been described, it will be understood that various modifications may be made thereof without departing from the spirit of the invention. For example, the oscillating directive patterns may be produced by known means other than mechanically operated antenna systems; the sweep voltages for the cathode ray tubes may be controlled by various means known in the art other than variable voltage dividers, and the images on the cathode ray tubes may be superimposed optically on a single camera tube rather than electrically. It will be apparent without further illustration that the runway line of position may be provided by means of a separate camera tube, rather than by the optical means shown in Figure 2. The distortion afforded optically by the cylindrical lens 75 may be as well introduced electrically, by superimposing upon the vertical deflection voltage of the tube 45 a further voltage, alternating at a frequency high enough to complete at least one cycle during each pulse from the pulse generator 43. Instead of using separate picture and camera tubes, the television signals corresponding to the azimuth and elevation information may be produced directly by double-ended image storage tubes, such as that described in U. S. Patent 2,273,172.

The invention has been described as an improved blind approach system for aircraft, in which the position of an airplane, both in azimuth and elevation, is determined by radio waves radiated from a ground station and reflected back thereto by the airplane. The azimuth and elevation information is presented at the ground station on cathode ray tubes. The images are combined and transmitted by television back to the aircraft. By distorting one of the images before combining it with the other, the combined image is made to appear in such form as to be readily interpretable by the pilot of the aircraft.

We claim as our invention:

1. A system for indicating the position of an aircraft with respect to a predetermined glide path, including a radar system comprising means for transmitting and receiving cyclically modulated radio signals in a fan-like beam narrow in azimuth and wide in elevation, means for rhythmically oscillating said beam from side to side throughout a sector which includes said glide path; cathode ray oscilloscope means, means for deflecting the cathode ray of said oscilloscope in synchronism with the modulation of said radio signals along a line which varies in direction in accordance with the variation in position of said radio beam, means responsive to said receiving means to momentarily intensify said cathode ray upon the reception of a radio signal reflected by said aircraft, whereby a display appears on said oscilloscope including a luminous spot at a position corresponding to the position in plan of said craft over the ground; a second radar system similar to said first radar system but providing a fan-like beam narrow in elevation and wide in azimuth, oscillating rhythmically up and down throughout a sector including said glide path, said second radar system including a cathode ray oscilloscope and means for deflecting the cathode ray thereof along a line which varies in direction in accordance with the variation in elevation of said second radio beam and at a rate along said line which also varies with variation in said elevation, means responsive to the receiving means of said second radar system to momentarily intensify the cathode ray of said last mentioned oscilloscope upon reception of a radio signal reflected by said aircraft to produce a display including a luminous spot on the screen of said second oscilloscope, means for distorting said last mentioned spot to make it appear as a line, means for superimposing the displays on the screens of said cathode ray tubes, television transmitter means for transmitting a signal representing a combination of said displays, and television receiver means on said aircraft responsive to said television signal to present a display like said combined displays.

2. A system for indicating the position of an aircraft with respect to a predetermined glide path, including means for transmitting and receiving cyclically modulated radio signals in a fan-like beam narrow in azimuth and wide in elevation, means for rhythmically oscillating said beam from side to side throughout a sector which includes said glide path; a cathode ray oscilloscope, means for deflecting the cathode ray of said oscilloscope in synchronism with the modulation of said radio signals along a line which varies in direction in accordance with the variation in position of said radio beam, means for momentarily intensifying said cathode ray upon the reception of a radio signal reflected by said aircraft, whereby a display appears on said oscilloscope including a luminous spot at a position corresponding to the position in plan of said craft over the ground; means for transmitting and receiving radio signals in a second fan-like beam narrow in elevation and wide in azimuth, oscillating rhythmically up and down throughout a sector including said glide path, a second cathode ray oscilloscope and means for deflecting the beam thereof along a line which varies in direction in accordance with the variation in elevation of said second beam and at a rate along said line which also varies with variation in said elevation, means for momentarily intensifying the cathode ray of said last mentioned oscilloscope upon reception of a radio signal in said second beam reflected by said aircraft to produce a display including a luminous spot on the screen of said second oscilloscope, means for distorting said last mentioned spot to make it appear as a line, means for superimposing the displays which appear on the screens of said cathode ray tubes, television transmitter means for transmitting a signal representing a combination of said displays, and television receiver means on said aircraft responsive to said television signal to present a display like said combined displays.

3. An instrument ground approach system for aircraft comprising a ground station including two radio locator systems of the sector scanning type, one scanning in azimuth through a horizontal sector which includes a predetermined glide path and the other scanning in elevation through a vertical sector including said glide path, said azimuth scanning system including means providing a map-like visual indication of the azimuth and the range of an aircraft with respect to said ground station, said elevation scanning system including means providing a similar visual indication of the elevation and the range of said craft with respect to said ground station, means for varying the range response of said elevation scanning system as a predetermined function of said elevation so that said range response is the same as that of said azimuth scanning system only when said elevation of said craft corresponds to that of said glide path, and means for superimposing said visual indications to provide a composite visual indication, whereby the relation between said range indication from said azimuth scanning system and said range indication from said elevation scanning system shows the relation between the elevation of said aircraft and the elevation of said glide path.

4. An instrument ground approach system for aircraft including means for producing a visual indication of the azimuth and range of an aircraft with reference to a predetermined point on the ground, in the form of two luminous spots corresponding respectively to said craft and said point;

means for producing a further visual indication of the elevation and range of said craft with reference to said point in the form of two further luminous spots corresponding respectively to said point and said craft; means for varying the relationship between range and the distance between said spots of said second indication as a predetermined function of said elevation, whereby said two indications of range correspond only when said craft is in a predetermined plane, means for distorting said second visual indication to cause said last mentioned spot corresponding to said craft to appear as a luminous line, and means for superimposing said distorted indication upon said first indication to provide a composite image comprising a spot corresponding to said reference point, a further spot corresponding to the position in range and azimuth of said craft, and a line whose position with reference to said last mentioned spot corresponds to the elevation of said craft with respect to said predetermined plane.

5. An instrument ground approach system for aircrift including means for producing a map-like visual indication of the azimuth and range of an aircraft with reference to a predetermined point on the ground, means for producing a further visual indication of the elevation and range of said craft with reference to said point; means for varying the relationship to range of said second indication as a predetermined function of said elevation whereby said two indications of range correspond only when said craft is in a predetermined line, means for superimposing said two visiual indications, and means for transmitting said superimposed indications as a single image to said aircraft.

6. An instrument ground approach system for aircraft including means for producing a map-like visual indication of the azimuth and range of an aircraft with reference to a predetermined point on the ground, means for producing a further visual indication of the elevation and range of said craft with reference to said point; means for varying the relationship to range of said second indication as a predetermined function of said elevation, whereby said two indications of range correspond only when said craft is in a predetermined line, and means for superimposing said two visual indications to provide a single composite image.

7. A system for indicating the position of an aircraft with respect to a predetermined glide path, including a radar system comprising means for transmitting and receiving cyclically modulated radio signals in a fan-like beam narrow in azimuth and wide in elevation, means for rhythmically oscillating said beam from side to side throughout a sector which includes said glide path; cathode ray oscilloscope means, means for deflecting the cathode ray of said oscilloscope in synchronism with the modulation of said radio signals along a line which varies in direction in accordance with the variation in position of said radio beam, means responsive to said receiving means to modulate said cathode ray upon the reception of a radio signal reflected by said aircraft, whereby an indication appears on said oscilloscope at a position corresponding to the position in plan of said craft over the ground; a second radar system similar to said first radar system but providing a fan-like beam narrow in elevation and wide in azimuth, oscillating rhythmically up and down throughout a sector including said glide path, said second radar system including a cathode ray oscilloscope and means for deflecting the cathode ray thereof along a line which varies in direction in accordance with the variation in elevation of said second radio beam and at a rate along said last mentioned line which also varies with variation in said elevation, means responsive to the receiving means of said second radar system to modulate the cathode ray of said last-mentioned oscilloscope upon reception of a radio signal reflected by said aircraft to produce an indication on the screen of said second oscilloscope, means for distorting said indication to make it appear as a line, and means for superimposing said line and said azimuth to provide a composite indication.

8. An instrument ground approach system for aircraft comprising a ground station including two radio locator systems of the sector scanning type, one scanning in azimuth through a horizontal sector which includes a predetermined glide path and the other scanning in elevation through a vertical sector including said glide path, said azimuth scanning system including means providing a map-like cathode ray scanning pattern representing the azimuth and the range of an aircraft with respect to said ground station, said elevation scanning system including means providing a similar cathode ray scanning pattern representing the elevation and the range of said craft with respect to said ground station, means for varying the range response of said elevation scanning system as a predetermined function of said elevation so that said range response is the same as that of said azimuth scanning system only when said elevation of said craft corresponds to that of said glide path, and means for effectively superimposing said patterns to provide a composite signal, and means responsive to said composite signal to provide a visual indication which shows the relation between the elevation of said aircraft and the elevation of said glide path.

9. An instrument ground approach system for aircraft including means for producing a map-like visual indication of the azimuth and range of an aircraft with reference to a predetermined point on the ground, means for producing a further visual indication of the elevation and range of said craft with reference to said point; means for varying the relationship to range of said second indication as a predetermined function of said elevation, whereby said two indications of range correspond only when said craft is in a predetermined line, and means for superimposing said two visual indications to provide a single composite image providing information as to the position of said aircraft with reference to said point, and means for transmitting said information to said aircraft.

IRVING WOLFF.
PHILIP J. HERBST.

REFERENCES CITED

The following references are of record in the file of this patent:

UNITED STATES PATENTS

| Number | Name | Date |
| --- | --- | --- |
| 2,245,660 | Feldman | June 17, 1941 |
| 2,307,029 | Elm | Jan. 5, 1943 |
| 2,399,671 | Gage | May 7, 1946 |
| 2,405,231 | Newhouse | Aug. 6, 1946 |